(12) United States Patent
Gidner et al.

(10) Patent No.: US 6,958,122 B1
(45) Date of Patent: Oct. 25, 2005

(54) HIGH PRESSURE AND HIGH TEMPERATURE REACTION SYSTEM

(75) Inventors: Anders Gidner, Karlskoga (SE); Lars Stenmark, Karlskoga (SE)

(73) Assignee: Chematur Engineering AB, Karlskoga (SE)

( * ) Notice: Subject to any disclaimer, the term of this patent is extended or adjusted under 35 U.S.C. 154(b) by 299 days.

(21) Appl. No.: 10/070,398

(22) PCT Filed: Aug. 31, 2000

(86) PCT No.: PCT/SE00/01675

§ 371 (c)(1),
(2), (4) Date: Mar. 1, 2002

(87) PCT Pub. No.: WO01/17915

PCT Pub. Date: Mar. 15, 2001

(30) Foreign Application Priority Data

Sep. 3, 1999 (SE) .................................... 9903113

(51) Int. Cl.[7] .............................................. C02F 1/72
(52) U.S. Cl. ......................... 210/761; 422/7; 422/241
(58) Field of Search ................. 210/758, 761, 210/762, 766; 422/184.1, 198, 208, 7, 240, 422/241

(56) References Cited

U.S. PATENT DOCUMENTS

| | | |
|---|---|---|
| 1,725,782 A | 8/1929 | Florez |
| 1,986,196 A | 1/1935 | Grosse |
| 1,988,456 A | 1/1935 | Lysholm |
| 2,398,546 A | 4/1946 | Messmore |
| 2,476,598 A | 7/1949 | Hall et al. |
| 2,519,616 A | 8/1950 | Watkins |
| 2,545,384 A | 3/1951 | Rehig |
| 2,647,368 A | 8/1953 | Triebbnigg et al. |
| 2,665,249 A | 1/1954 | Zimmerman |
| 2,692,800 A | 10/1954 | Nichols et al. |
| 2,697,910 A | 12/1954 | Brzozowski |
| 2,735,265 A | 2/1956 | Eastman |
| 2,767,233 A | 10/1956 | Mullen et al. |
| 2,824,058 A | 2/1958 | Zimmermann |
| 2,944,396 A | 7/1960 | Barton et al. |
| 3,047,003 A | 7/1962 | Gurney |
| 3,047,371 A | 7/1962 | Krause et al. |
| 3,101,592 A | 8/1963 | Robertson et al. |
| 3,129,587 A | 4/1964 | Hallanger |
| 3,149,176 A | 9/1964 | Glazier et al. |

(Continued)

FOREIGN PATENT DOCUMENTS

DE 40 03 377 8/1991

(Continued)

OTHER PUBLICATIONS

Chowdhury et al., "Catalytic Wet Oxidation of Strong Waste Waters," AIChE Symp. 151:71 (1975) pp. 46-58.

(Continued)

*Primary Examiner*—Peter A. Hruskoci
(74) *Attorney, Agent, or Firm*—Meyertons, Hood, Kivlin, Kowert & Goetzel, P.C.; Eric B. Meyertons

(57) ABSTRACT

In a high pressure and high temperature reaction system suitable for oxidative waste treatment, particularly a reaction system for supercritical water oxidation (SCWO), a method is disclosed for injecting a first fluid of a first temperature at a first flow rate into a second fluid of a second temperature at a second flow rate, mixing the first and the second fluids within a mixing length (115, 215), and wherein the first and second temperatures and the first and second flow rates are selected such that a temperature of the mixed fluids downstream of said mixing length (115, 215) is obtained, at which said first fluid being substantially non-corrosive.

35 Claims, 2 Drawing Sheets

U.S. PATENT DOCUMENTS

| | | |
|---|---|---|
| 3,207,572 A | 9/1965 | Saul |
| 3,282,459 A | 11/1966 | Wilson |
| 3,414,004 A | 12/1968 | Bankston |
| 3,431,075 A | 3/1969 | Gunnell |
| 3,449,247 A | 6/1969 | Bauer |
| 3,464,885 A | 9/1969 | Land et al. |
| 3,472,632 A | 10/1969 | Hervert et al. |
| 3,515,520 A | 6/1970 | Hervert |
| 3,549,314 A | 12/1970 | Shah |
| 3,606,999 A | 9/1971 | Lawless |
| 3,626,874 A | 12/1971 | Grant |
| 3,654,070 A | 4/1972 | Pradt et al. |
| 3,674,045 A | 7/1972 | Millman et al. |
| 3,682,142 A | 8/1972 | Newkirk |
| 3,716,474 A | 2/1973 | Hess et al. |
| 3,743,606 A | 7/1973 | Marion et al. |
| 3,761,409 A | 9/1973 | McCoy et al. |
| 3,804,756 A | 4/1974 | Callahan et al. |
| 3,816,338 A | 6/1974 | Corson |
| 3,849,075 A | 11/1974 | Albright et al. |
| 3,849,536 A | 11/1974 | Morgan |
| 3,852,192 A | 12/1974 | Fassell et al. |
| 3,853,759 A | 12/1974 | Titmas |
| 3,876,497 A | 4/1975 | Hoffman |
| 3,876,536 A | 4/1975 | Pradt et al. |
| 3,886,972 A | 6/1975 | Scott et al. |
| 3,899,923 A | 8/1975 | Teller |
| 3,900,300 A | 8/1975 | Lehman |
| 3,912,626 A | 10/1975 | Ely et al. |
| 3,920,506 A | 11/1975 | Morgan |
| 3,920,548 A | 11/1975 | Fassell et al. |
| 3,929,429 A | 12/1975 | Crouch |
| 3,938,972 A | 2/1976 | Sugimura |
| 3,945,805 A | 3/1976 | Costello et al. |
| 3,945,806 A | 3/1976 | Costello et al. |
| 3,977,966 A | 8/1976 | Pradt et al. |
| 3,978,661 A | 9/1976 | Cheng |
| 3,984,311 A | 10/1976 | Diesen et al. |
| 4,000,068 A | 12/1976 | Nelson et al. |
| 4,005,803 A | 2/1977 | Kent |
| 4,008,994 A | 2/1977 | Numasake et al. |
| 4,010,098 A | 3/1977 | Fassell |
| 4,013,560 A | 3/1977 | Pradt |
| 4,017,421 A | 4/1977 | Othmer |
| 4,061,556 A | 12/1977 | Reis et al. |
| 4,075,281 A | 2/1978 | Port et al. |
| 4,094,815 A | 6/1978 | Cedro, III et al. |
| 4,100,730 A | 7/1978 | Pradt |
| 4,113,446 A | 9/1978 | Modell et al. |
| 4,120,644 A | 10/1978 | Numasaki et al. |
| 4,124,528 A | 11/1978 | Modell |
| 4,141,829 A | 2/1979 | Thiel et al. |
| 4,145,283 A | 3/1979 | Topp et al. |
| 4,146,359 A | 3/1979 | Lumpkin et al. |
| 4,147,624 A | 4/1979 | Modell |
| 4,174,280 A | 11/1979 | Pradt et al. |
| 4,191,012 A | 3/1980 | Stoddard et al. |
| 4,199,545 A | 4/1980 | Matovich |
| 4,212,735 A | 7/1980 | Miller |
| 4,215,094 A | 7/1980 | Inao et al. |
| 4,217,218 A | 8/1980 | Bauer |
| 4,221,577 A | 9/1980 | Lowrie |
| 4,221,763 A | 9/1980 | Greene |
| 4,229,296 A | 10/1980 | Wheaton et al. |
| 4,241,722 A | 12/1980 | Dickinson |
| 4,261,805 A | 4/1981 | Galliker et al. |
| 4,272,383 A | 6/1981 | McGrew |
| 4,284,015 A | 8/1981 | Dickinson |
| 4,292,953 A | 10/1981 | Dickinson |
| 4,326,957 A | 4/1982 | Rosenberg |
| 4,338,199 A | 7/1982 | Modell |
| 4,344,785 A | 8/1982 | Jensen |
| 4,370,223 A | 1/1983 | Bose |
| 4,377,066 A | 3/1983 | Dickinson |
| 4,378,976 A | 4/1983 | Rush |
| 4,379,124 A | 4/1983 | Fouquet |
| 4,380,960 A | 4/1983 | Dickinson |
| 4,384,897 A | 5/1983 | Brink |
| 4,384,959 A | 5/1983 | Bauer et al. |
| 4,398,295 A | 8/1983 | Mihara et al. |
| 4,460,628 A | 7/1984 | Wheaton et al. |
| 4,462,904 A | 7/1984 | Hager et al. |
| 4,485,003 A | 11/1984 | Coenen et al. |
| 4,488,866 A | 12/1984 | Schirmer et al. |
| 4,490,346 A | 12/1984 | Cheng |
| 4,510,958 A | 4/1985 | Coursen |
| 4,526,584 A | 7/1985 | Funk |
| 4,541,990 A | 9/1985 | Mitterbacher |
| 4,543,190 A | 9/1985 | Modell |
| 4,564,458 A | 1/1986 | Burleson |
| 4,593,202 A | 6/1986 | Dickinson |
| 4,594,164 A | 6/1986 | Titmas |
| 4,604,215 A | 8/1986 | McCorquodale |
| 4,643,890 A | 2/1987 | Schramm |
| 4,668,256 A | 5/1987 | Billiet et al. |
| 4,671,351 A | 6/1987 | Rappe |
| 4,683,122 A | 7/1987 | Concordia et al. |
| 4,689,054 A | 8/1987 | Vara et al. |
| 4,692,252 A | 9/1987 | Atwood et al. |
| 4,698,157 A | 10/1987 | Gillot |
| 4,713,177 A | 12/1987 | Atwood et al. |
| 4,714,032 A | 12/1987 | Dickinson |
| 4,714,526 A | 12/1987 | Pennisi et al. |
| 4,721,575 A | 1/1988 | Binning et al. |
| 4,733,852 A | 3/1988 | Glasgow et al. |
| 4,741,386 A | 5/1988 | Rappe |
| 4,744,908 A | 5/1988 | Peterscheck et al. |
| 4,744,909 A | 5/1988 | Ferraro et al. |
| 4,749,492 A | 6/1988 | Berrigan, Jr. et al. |
| 4,762,148 A | 8/1988 | Marui et al. |
| 4,765,900 A | 8/1988 | Schwoyer et al. |
| 4,767,543 A | 8/1988 | Chornet et al. |
| 4,774,006 A | 9/1988 | Kaufmann |
| 4,784,672 A | 11/1988 | Sircar |
| 4,792,408 A | 12/1988 | Titmas |
| 4,793,153 A | 12/1988 | Hembree et al. |
| 4,797,524 A | 1/1989 | Moret et al. |
| 4,801,090 A | 1/1989 | Yoshida et al. |
| 4,803,054 A | 2/1989 | Sillerud et al. |
| 4,822,394 A | 4/1989 | Zeigler et al. |
| 4,822,497 A | 4/1989 | Hong et al. |
| 4,853,136 A | 8/1989 | Roussel et al. |
| 4,853,205 A | 8/1989 | Tolley et al. |
| 4,861,484 A | 8/1989 | Lichtin et al. |
| 4,861,497 A | 8/1989 | Welch et al. |
| 4,869,833 A | 9/1989 | Binning et al. |
| 4,872,890 A | 10/1989 | Lamprecht |
| 4,880,440 A | 11/1989 | Perrin |
| 4,887,628 A | 12/1989 | Bowe et al. |
| 4,891,139 A | 1/1990 | Zeigler et al. |
| 4,898,107 A | 2/1990 | Dickinson |
| 4,928,885 A | 5/1990 | Nakao |
| 4,936,990 A | 6/1990 | Brunsell et al. |
| 4,957,721 A | 9/1990 | Lonsinger et al. |
| 4,962,275 A | 10/1990 | Bruno |
| 4,963,329 A | 10/1990 | Burgess et al. |
| 4,968,328 A | 11/1990 | Duke |
| 4,983,296 A | 1/1991 | McMahon et al. |
| 5,009,857 A | 4/1991 | Haerle |
| 5,011,614 A | 4/1991 | Gresser et al. |
| 5,013,698 A | 5/1991 | Lonsinger et al. |
| 5,052,426 A | 10/1991 | Kasper |
| 5,053,142 A | 10/1991 | Sorensen et al. |
| 5,057,220 A | 10/1991 | Harada et al. |

| | | |
|---|---|---|
| 5,057,231 A | 10/1991 | Mueller et al. |
| 5,075,017 A | 12/1991 | Hossain et al. |
| 5,106,513 A | 4/1992 | Hong |
| 5,110,581 A | 5/1992 | Derrah |
| 5,124,292 A | 6/1992 | Larsen et al. |
| 5,133,877 A | 7/1992 | Rofer et al. |
| 5,167,930 A | 12/1992 | Fassbender et al. |
| 5,183,577 A | 2/1993 | Lehmann |
| 5,186,910 A | 2/1993 | Alagy et al. |
| 5,192,453 A | 3/1993 | Keckler et al. |
| 5,198,398 A | 3/1993 | van Duijn |
| 5,199,853 A | 4/1993 | Padden |
| 5,207,399 A | 5/1993 | Risberg et al. |
| 5,221,486 A | 6/1993 | Fassbender et al. |
| 5,230,810 A | 7/1993 | Clark et al. |
| 5,230,872 A | 7/1993 | Tiggelbeck et al. |
| 5,232,604 A | 8/1993 | Swallow et al. |
| 5,232,605 A | 8/1993 | Baur et al. |
| 5,238,671 A | 8/1993 | Matson et al. |
| 5,240,619 A | 8/1993 | Copa et al. |
| 5,250,193 A | 10/1993 | Sawicki et al. |
| 5,252,224 A | 10/1993 | Modell et al. |
| 5,252,297 A | 10/1993 | Nakai |
| 5,266,540 A | 11/1993 | Menicagli et al. |
| 5,280,701 A | 1/1994 | Tolman |
| 5,326,540 A | 7/1994 | Chastagner |
| 5,339,621 A | 8/1994 | Tolman |
| 5,358,645 A | 10/1994 | Hong et al. |
| 5,358,646 A | 10/1994 | Gloyna et al. |
| 5,367,147 A | 11/1994 | Kim et al. |
| 5,370,799 A | 12/1994 | Oddo et al. |
| 5,384,051 A | 1/1995 | McGinness |
| 5,385,214 A | 1/1995 | Spurgeon |
| 5,387,398 A | 2/1995 | Mueggenburg et al. |
| 5,405,533 A | 4/1995 | Hazlebeck et al. |
| 5,405,812 A | 4/1995 | Bruggendick |
| 5,417,937 A | 5/1995 | Voight et al. |
| 5,417,953 A | 5/1995 | Cappelli |
| 5,421,998 A | 6/1995 | Li et al. |
| 5,425,883 A | 6/1995 | Reid et al. |
| 5,427,764 A | 6/1995 | Barber |
| 5,437,798 A | 8/1995 | LaRoche et al. |
| 5,454,950 A | 10/1995 | Li et al. |
| 5,461,648 A | 10/1995 | Nauflett et al. |
| 5,492,634 A | 2/1996 | Hong et al. |
| 5,527,471 A | 6/1996 | Hong et al. |
| 5,536,385 A | 7/1996 | Sheldon et al. |
| 5,543,057 A | 8/1996 | Whiting et al. |
| 5,545,337 A | 8/1996 | Hong |
| 5,551,472 A | 9/1996 | McBrayer, Jr. et al. |
| 5,552,039 A | 9/1996 | McBrayer, Jr. et al. |
| 5,558,783 A | 9/1996 | McGuinness |
| 5,560,822 A | 10/1996 | Bond et al. |
| 5,560,823 A | 10/1996 | Whiting |
| 5,571,423 A | 11/1996 | Daman |
| 5,571,424 A | 11/1996 | Ahluwalia |
| 5,582,715 A | 12/1996 | McBrayer, Jr. et al. |
| 5,591,415 A | 1/1997 | Dassel et al. |
| 5,607,595 A | 3/1997 | Hiasa et al. |
| 5,620,606 A | 4/1997 | McBrayer, Jr. et al. |
| 5,628,819 A | 5/1997 | Mestemaker et al. |
| 5,630,434 A | 5/1997 | Gray et al. |
| 5,674,405 A * | 10/1997 | Bourhis et al. ............. 210/761 |
| 5,755,974 A | 5/1998 | McBrayer, Jr. et al. |
| 5,770,174 A | 6/1998 | Eller et al. |
| 5,804,066 A * | 9/1998 | Mueggenburg et al. ..... 210/177 |
| 5,932,182 A * | 8/1999 | Blaney ....................... 422/240 |
| 6,121,179 A | 9/2000 | McBrayer, Jr. et al. |
| 6,495,110 B1 * | 12/2002 | Higo et al. ................. 422/201 |

FOREIGN PATENT DOCUMENTS

| | | |
|---|---|---|
| EP | 4-745 | 10/1979 |
| EP | 073 355 | 4/1983 |
| EP | 085 961 A1 | 7/1983 |
| EP | 135 144 A1 | 3/1985 |
| EP | 388 915 A1 | 9/1990 |
| EP | 480 492 A1 | 4/1992 |
| EP | 513 186 B1 | 11/1992 |
| EP | 0 572 913 A1 | 12/1993 |
| EP | 595 858 B1 | 4/1995 |
| EP | 0 689 868 | 6/1995 |
| EP | 0 708 058 A2 | 4/1996 |
| EP | 0 818 240 A2 | 1/1998 |
| FR | 75/18815 | 6/1975 |
| FR | 2 314 426 | 1/1977 |
| FR | 2 410 504 | 8/1979 |
| GB | 584671 | 2/1947 |
| GB | 2075484 | 11/1981 |
| GB | 2297321 | 7/1996 |
| JP | 53091093 | 8/1978 |
| JP | SHO 57-4225 | 1/1982 |
| JP | 62-68414 | 3/1987 |
| JP | 1-38532 | 8/1989 |
| JP | 10-137774 | 5/1998 |
| JP | 10-137775 | 5/1998 |
| SE | 8200067-0 | 1/1992 |
| SU | 521233 | 9/1976 |
| SU | 483881 | 11/1977 |
| SU | 576683 | 1/1980 |
| WO | 87/01381 | 3/1987 |
| WO | 90/01367 | 2/1990 |
| WO | 90/06189 | 6/1990 |
| WO | 91/11394 | 7/1991 |
| WO | 81/03169 | 11/1991 |
| WO | 92/18428 | 10/1992 |
| WO | 92/21621 | 12/1992 |
| WO | 92/21622 | 12/1992 |
| WO | 93/00304 | 1/1993 |
| WO | 93/02969 | 2/1993 |
| WO | 94/11310 | 5/1994 |
| WO | 95/33693 | 6/1995 |
| WO | 96/16906 | 11/1995 |
| WO | 96/27558 | 9/1996 |
| WO | WO98/47612 * | 10/1998 |
| WO | 00/02820 | 7/1999 |

OTHER PUBLICATIONS

Freeman, "Innovative Thermal Hazardous Organic Waste Treatment Processes," Noyes Publication Park Ridge, New Jersey (1985), pp. 12-33.

Gloyna, et al. "Supercritical Water Oxidation—Deep Well Technology for Toxic Wastewaters and Sludes," Technical Report, The University of Texas at Austin, 1989.

Imamura et al., "Wet Oxidation of Acetic Acid Catalyzed by Co-Bi Complex Oxides," Ind. Eng. Chem. Prod. Res. Dev., 21(4), pp. 570-575 (1982).

Lee et al., "Efficiency of Hydrogem Peroxide and Oxygen in Supercritical Water Oxidation of 2,4-Dichlorophenol and Acetic Acid," The Journal of Supercritical Fluids, 3 pp. 249-255 (1990).

Lu et al., "Selective Particle Deposition in Crossflow Filtration," Sep. Sci. and Technol., 24(7&8), 517-540 (1989).

Mahlman et al., "Cross-Flow Filtration in Physical Chemical Treatment of Municipal Sewage Effluents," Oak Ridge Natl. Lab. Technical Report, EPA/600/2-76/025, Feb. 1976.

Modell et al., "Supercritical Water—Testing Reveals New Process Holds Promise," Solid Wastes Management, Aug. 1982.

Murkes, "Low-shear and High-shear Cross-flow Filtration," Filtration and Separation, 23(6), 364-36 (1986).

Murkes et al., Crossflow Filtration: Theory and Practice, John Wiley & Sons: New York, 1988.

Opatken, "Aqueous-Phase Oxidation of Sludge Using the Vertical Reaction Vessel System," EPA/600/2-87/022, Mar. 1987.

Perona et al., A Pilot Plant for Sewage Treatment by Cross-Flow Filtration,: Oak Ridge Natl. Lab. Technical Report ORNL-TM-4659, Oct. 1974.

Shapira et al., Removal of Heavy Metals and Suspended Solids from Battery Wastewaters: Application of Hydroperm Cross-flow Microfiltration,: Gen. Battery Corp. Report EPA/600/2-81-1 Aug. 1981.

Thomason et al., "Supercritical Water Destruction of Aqueous Wastes," Hazardous Waste, 1(4), 453 467 (1984).

Teletzke, G. H. "Wet Air Oxidation," Chem. Eng. Prog., 60(1), pp. 33-38, Jan. 1964.

Yang et al., "Homogenous Catalysis in the Oxidation of p-Chlorophenol in Supercritical Water," In Eng. Chem. Res., 27(1), pp. 2009-2014 (1988).

Zimmermann, "New Waste Disposal Process," Chem. Eng., pp. 117-120, Aug., 1958.

Jacobs et al., "Phase Segregation," Handbook of Separation Process Technology, published by John Wiley & Sons (1987).

Stone & Webster Engineering Corp., "Assessment and Development of an Industrial Wet Oxidation System for Burning Waste and Low Grade Fuels," Final Report, Work Performed Under Contract DE-FC07 881D12711, Prepared for U.S. Department of Energy, Sep., 1989.

Todheide et al., "Das Zweiphasengebiet und die kritische Kurve im System Kohlendioxid—Wasser bis zu Druken von 3500 bar," Zeitschrift fur Physikalischo Chemie Neue Folge, Bd. 37, 8. 387-401 (1963).

Chang et al., "Supercritical water oxidation of acetic acid by potassium permanganate," J. of Hazardous Materials, vol. 32, pp. 001-012 (1992).

Harada, "Wet Catalytic Oxidation Process for Wastewater Treatment," Abstract (1991).

Imamura et al., "Wet Oxidation of Ammonia Catalyzed by Cerium-Based Composite Oxides," Ind. Eng. Chem. Prod. Res. Dev., vol. 24, No. 1, pp. 75-80 (1985).

Jin et al., "The Effect of Supercritical Water on the Catalytic Oxidation of 1-4-Dichlorobenzene," presented by AIChE Spring Meeting, Orlando, FL, Mar. 19-23 (1990), Abstract.

Lee et al., "Efficiency of $H_2O_2$ in Supercritical Water Oxidation of 2, 4-Dichlorophenol and Acetic Acid," presented at AIChE Spring Meeting, Orlando, FL, Mar. 18-22 (1990).

Teletzke et al., "Components of Sludge and Its Wet Air Oxidation Products," Journal WPCF, 39 (6) 994-1005, 1967.

Conditt et al., "Microanalysis of Reaction Products in Sealed Tube Wet Air Oxidations by Capillary Gas Chromatography," Anal. Chem., 56:2620-2622, 1984.

McGinnis et al., "Conversion of Biomass into Chemicals with High-Temperature Wet Oxidation," Ind. Eng. Chem. Prod. Reg, Dev., 22(4):633-636, 1984.

Baker, et al., "Membrane Separation Systems—A Research & Development Needs Assessment," Department of Energy Membrane Separation Systems Research Needs Assessment Group, Final Report, II, Mar. 1990.

Urusova, Phase Equilibria in the Sodium Hydroxide-Water and Sodium Chloride-Water Systems at 350-550 deg., Russian Journal of Inorganic Chemistry, 19-(3):450-454, 1974.

Valyashko, "Phase Equilibria in Water-Salt Systems: Some Problems of Solubility at Elevated Temperature and Pressure," High Temperature High Pressure Electrochemistry in Aqueous Solution National Association of Corrosion Engineers, 4:153-157, 1976.

Armellini, "Salt Separation During Supercritical Water Oxidation of Human Metabolic Waste: Fundamental Studies of Salt Nucleation and Growth," Society of Automotive Engineers, Inc., pp. 189-203, 1990.

Dell-Orco et al., "The Solubility of 1:1 Nitrate Electrolytes in Supercritical Water," Los Alamos National Lab Reporter, LA-UR-92-3359, pp. 1-17, 1992.

Martynova, "Solubility of Inorganic Compounds in Subcritical and Supercritical Water," High Temperature High Pressure Electrochemistry in Aqueous Solutions. National Association of corrosion Engineers, 4:131-138, 1976.

Armellini et al, "Solubilities of Sodium Chloride and Sodium Sulfate in Sub- and Supercritical Wat Vapor," AIChE National Meeting, Los Angeles, California, Nov. 17-22, 1991, pp. 1-15.

McBrayer et al., "Research and Development of a Commercial Supercritical Water Oxidation Process," Hazardous Material International 1993, Proceedings, 11$^{th}$ Annual Eng. Management and Technology Conference.

"Researchers Explore Applications for Supercritical Water Oxidation," The Hazardous Waste Consultant, Mar./Apr. 1994, pp. 1.11-1.15.

Collection of Information from presentations given to representatives of Texas in or about Dec. 1991 to Jan. 1992, including "Case 1" flow diagram, a "Reaction Injection System" diagram, a "Process Flow diagram," a "Case 2" flow diagram, a diagram entitled "TCA SCWO Unit Schedule" dated Jan. 10, 1992, a diagram entitled "Phases of Water at Moderate Pressures," a diagram entitled "Figu PD2 Properties of Water (3,200-4,400 psia)," a diagram entitled "Figure PD9 Basic Configuration o Supercritical Oxidation Unit," a diagram entitled "UTPILOT Unit Coiled Reactor," a diagra plotting "temperature vs. Distance from reactor inlet," a chart and diagram entitled "Texaco Waste Run Dec. 15, 1991."

Handwritten Notes relating to work done in or about May, 1993 (9 pages).

Handwritten Notes by Roy McBrayer dated Jul.-Dec. 1991 (5 pages).

Handwritten Notes relating to work done on or about Dec., 1991 (11 pages).

Handwritten Notes relating to work done on or about Jan., 1992 (14 pages).

Handwritten Notes by Jimmy Swan dated Aug. 7, 1991 and Aug. 27, 1991 (2 pages).

Handwritten Notes by James Eller dated Jul.-Nov., 1991 (5 pages).

Killilea et al., "The Fate of Nitrogen in Supercritical Water Oxidation" MODAR, Inc., Natick, Massachusetts 01760 USA.

Excerpts From Publication Showing Salt Mixture Properties (pp. 124, 780, 781, 814, 816), date unavailable.

Fassbender, Supercritical Water Oxidation Workshop, "The Dual Shell Pressure Balanced Vessel: Reactor For Corrosive Applications," (11 pages), date unavailable.

Excerpts From Publication "Strategies for Sticky Salts," (2 pages), date unavailable.

Eco Waste Technologies, "Fact Sheet" and photograph of SCWO Pilot Plant, Aug., 1994 (2 pages, date unavailable.

Eco Waste Technologies, "Environmental Breakthrough: Huntsman Announces Successful Use of New Technology," (2 pages), date unavailable.

Eco Waste Technologies, Circular on Supercritical Water Oxidation (5 pages), date unavailable.

Griffith, "Destruction of Aqueous Organic Wastes by Supercritical Water Oxidation," Jun. 15-17, 1994, (12 pages).

Gloyna,; "Supercritical Water Oxidation Applications For Industrial Sludes," Jan. 30, 1992, (pp 1-15).

Gloyna et al., "Supercritical Water Oxidation: An Engineering Update," Feb. 1992, (pp. 1-25).

"Separation Update," Separations Research Program Center for Energy Studies, The University of Texas at Austin, Spring 1994 issue, (pp. 1-4).

Gloyna, et al., "Engineering Aspects of Supercritical Water Oxidation," Wat. Sci. Tech., vol. 30, N 9, 1994, (pp. 1-10).

Tester, et al., "Supercritical Water Oxidation Technology: A Review of Process Development and Fundamental Research", 1991 ACS Symposium Series Paper on Emerging Technologies for Hazardous Waste Management, Oct. 1-3, 1991, Atlanta, Georgia, Chemical Engineering Department, Massachusetts Institute of Technology, Cambridge, Massachusetts, pp. 1-58.

Zimmermann, et al., The Zimmermann Process and Its Applications in the Pulp and Paper Industry Tappi, Aug. 1960, vol. 43, No. 8., pp. 710-715.

Barner, et al., "Supercritical Water Oxidation: An Emerging Technology", Presented at ACHEMA 1991—International Meeting on Chemical Engineering and Biotechnology, Jun. 9, 1991, ABB Lummus Crest Inc., pp. 1-14, Figs. 1-8.

Takahashi, et al., "Subcritical and Supercritical Water Oxidation of CELSS Model Wastes", Department of Civil Engineering, Nigata University, Japan, pp. 95-106.

Whitlock, "Organic Reations in Supercritical Water", Submitted in Partial Fulfillment of the Requirements for the Degrees of Bachelor of Science and Master of Science at the Massachusetts Institute of Technology, May, 1978, pp. 1-77.

Supercritical Water Oxidation Information Package, Aug. 1994, Eco Waste Technologies, pp. 1-4.

Pennwell Publishing Co., "Supercritical Water Oxidation Unit Destroys Organic Wastes," Oil and Gas Journal, Oct. 1994.

McBrayer et al., "Operation of the First Supercritical Water Oxidation Industrial Waste Facility," Eco Waste Technologies, 1995, pp. 1-8.

Cheremisinoff et al., editors, Pollution Engineering Practice Handbook, Ann Arbor Science Publishers, Inc., 1975, pp. 732-735.

Sheets, "Erosion Control in Supercritical Water Systems," Submitted in partial Fulfillment of the Requirement for a Master's Thesis at University of Texas at Austin, May, 1991, pp. 40-50.

General College Chemistry, 5$^{th}$ Edition, Keenan, Charles W. et al., pp. 179-180.

Bramlette et al., "Destruction of DOE/DP Surrogate Wastes with Supercritical Water Oxidation Technology", Sandia National Laboratories Report, Nov. 1990, pp. 1-35.

Caruana, "Supercritical Water Oxidation Aims for Wastewater Cleanup," Chem. Eng. Prog., Apr. 1995.

Dell'Orco et al., "Reactions of Nitrate Salts with Ammonia in SuperCritical Water," Ind. Eng. Chem vol. 36 No. 7 1997.

Kritzer et al., "The Corrosion of Nickel-base Alloy 625 in Sub and Supercritical Aqueous Solutions HN03 in the Presence of Oxygen," J. Material Science Letters, 1999.

Josephson, Julian, "Supercritcal Fluids" Environ. Sci. Technol., 1982, p. 548A-551A.

Cocero et al.; "SCWRO Process For Regeneration of Activated Carbon and Destruction of Pollutan in Supercritical Water" Proceedings of the Chemviron Carbon Award Meeting, University of Leuve May 1997.

* cited by examiner

HIGH PRESSURE AND HIGH TEMPERATURE REACTION SYSTEM

TECHNICAL FIELD OF THE INVENTION

The present invention generally relates to an apparatus for mitigation of corrosion in a high pressure and high temperature reaction system, specifically in a system suitable for oxidative waste treatment under supercritical water conditions. The invention relates further to the reaction system itself and to a method in said reaction system.

DESCRIPTION OF RELATED ART AND BACKGROUND OF THE INVENTION

Several approaches for disposing of waste are available today, of which the major ones are landfilling and incineration. In recent years, another technique based on supercritical water oxidation (SCWO) has been commercialized, see, e.g. Supercritical *Water Oxidation Aims for Wastewater Cleanup*, C. M. Caruana, Chem. Eng. Prog., April 1995.

Supercritical water oxidation is a novel and advanced process for, inter alia, effective destruction of toxic substances, particularly organic pollutions, in wastewater and sludge. The process converts, fast and effectively, organic materials containing substantially carbon and hydrogen to carbon dioxide and water, at a temperature above the critical point of water (374° C. and 22,13 MPa), while releasing energy. The process may be completely contained and the destruction efficiency is often higher than 99%.

Heavy metals present during the process are converted to their oxides whereas sulfur and phosphorous are converted to sulfate and phosphate, respectively. Halogens are converted to their corresponding acids, e.g., hydrochloric acid. Smaller amounts of nitrogen compounds, e.g. amines and ammonia, which exist in the waste material flow, are converted to molecular nitrogen, and not to $NO_x$, which is an acidifying and fertilizing residual product and therefore undesirable in the effluent.

If, however, the waste material contains large amounts of ammonia and/or organic nitrogen compounds, substantial amounts of the nitrogen source may be found in the effluent as ammonia as a result of the destruction process. This phenomenon is undesirable as ammonia constitutes a fertilizing compound. Besides, discharge of ammonia without further purifying is very often imposed with restrictions.

It is known in the literature, e.g. through *Reactions of Nitrate Salts with Ammonia in Supercritical Water*, P. C. Dell'Orco et al., Ind. Eng. Chem., Vol. 36, No. 7, 1997, and references therein, that ammonia can be converted to molecular nitrogen during supercritical water oxidation conditions if nitric acid is used as a co-oxidant together with molecular oxygen, hydrogen peroxide or another suitable compound. The nitric acid has preferably to be supplied to the waste material flow firstly after that the organic contents have been destructed with oxygen as nitrate otherwise will compete with oxygen in the destruction of the organic contents. Furthermore, the nitric acid has to be dosed with high accuracy relative to the amount of ammonia (a stoichiometric amount is needed). If too little nitric acid is supplied, a remaining amount of ammonia will be left whereas too large amounts of nitric acid will result in an excess of nitrate in the effluent.

For purposes of strength and corrosion, nickel-based alloys, such as Hastelloy or Inconel, are employed for manufacturing of equipment for SCWO. Acids, and not at least nitric acid, are, however, in presence of oxygen strongly corrosive at high temperatures, though still sub-critical ones, even if these corrosion resistant nickel alloys are used, see, e.g. *The Corrosion of Nickel-base Alloy 625 in Sub- and Supercritical Aqueous Solutions of $HNO_3$ in the Presence of Oxygen*, P. Kritzer et al., J. Mater. Sci. Lett., 1999, in print, and references therein. It was found in the temperature-resolved corrosion measurements reported that the corrosion due to nitric acid was most severe at temperatures between about 270° C. and 380° C., the same temperature range in which general corrosion is caused by the mixtures $HCl/O_2$ and $H_2SO_4/O_2$, respectively. At supercritical temperatures the corrosion rates were low.

For this reason, particular solutions must be employed for the entry of nitric acid into the supercritical wastewater flow containing ammonia or ammonium salts to avoid or at least minimize the corrosion.

However, as regards corrosion, generally the most troublesome compound in the supercritical water oxidation process is the chlorine element, since it is very common in various chemical substances. If the chlorine is present as an ion at elevated temperatures, it will corrode the construction materials mentioned above. The chlorine may have been an ion originally, liberated during heat up or in the reactor.

U.S. Pat. No. 5,358,645 issued to Hong et al. disclose an apparatus and process for high temperature water oxidation, the apparatus (not in detail described) having a surface area, that may be exposed to corrosive material, composed of zirconia based ceramics. The ceramics may be employed as coatings or linings.

U.S. Pat. No. 5,461,648 issued to Nauflett et al. disclose a supercritical water oxidation reactor with a corrosion-resistant lining. The inner surface of the reactor vessel is coated with artificial ceramic or diamond. A cylindrical baffle for introducing the oxygenating agent extends axially within the interior of the vessel and has its exterior surface inside the vessel coated with said artificial ceramic or diamond.

U.S. Pat. No. 5,552,039 issued to McBrayer, Jr. et al. disclose a turbulent flow cold-wall reactor. It mentions, inter alia, that if the atmosphere in the reaction chamber is harsh and corrosive, the inside wall of the reaction chamber should preferably be made of or covered with a coating or a liner withstanding the harsh atmosphere.

None of these US patents, is, however, discussing corrosion problems in terms of temperature dependent corrosivity, or the particular corrosion caused by the corrosive compounds discussed above.

SUMMARY OF THE INVENTION

Embodiments of an apparatus and methods for mitigation of corrosion in a high pressure and high temperature reaction system that can be used for oxidative waste treatment under supercritical water conditions are described.

In an embodiment of a system and method for oxidative waste treatment, a first fluid may be transported through a first conduit at a first flow rate and at a first temperature. Construction of the first conduit may be such that the first conduit may have an end within the interior of the second conduit, and is in fluid communication with the second conduit. Fluid communication between the first conduit and second conduit may allow the first fluid to be injected into the second fluid. Transportation of the second fluid may occur in a second conduit at a second temperature and a second flow rate. The first fluid may be corrosive in a corrosive temperature range and the corrosive temperature range may exclude the second temperature.

The first and second fluids may be mixed in the second conduit at a mixing length downstream of the end of the first conduit. The second conduit may include a tube or liner having at least an inner surface area made of a corrosion resistant material and extending along the mixing length to inhibit corrosion of the second conduit. As used herein, "mixing length" is the distance necessary for a mixed fluid to reach a steady state temperature.

The first and second temperatures and the first and second flow rates may be selected such that the mixed fluids downstream of the mixing length are at a temperature that is substantially non-corrosive for the first fluid.

In an embodiment, a high pressure and high temperature reaction system suitable for oxidative waste treatment may include a first and a second conduit adapted to transport a first and a second fluid. The second conduit may be adapted to transport the second fluid at a second temperature and at a second flow rate. Transportation of the first fluid in the first conduit may occur at a first flow rate. The first fluid may be at a first temperature, which is corrosive in a corrosive temperature range, which excludes the second temperature.

The first conduit may have an end within the interior of the second conduit, which allows the first conduit to be in fluid communication with the second conduit. Fluid communication of the first and second conduits may be such that the first fluid and the second fluid can be mixed in the second conduit within a mixing length from the end of the first conduit. As a result of the mixing, the mixed fluids downstream of the mixing length may have a temperature substantially non-corrosive for the first fluid.

The high pressure and high temperature reaction system may have a tube or liner having at least an inner surface area made of a corrosion resistant material. The tube or liner may be part of the second conduit and may extend along the mixing length to inhibit corrosion of the second conduit. The second conduit may be made up of a conventional construction material (e.g., nickel based alloy) upstream and downstream of the tube or liner configured for high pressure and high temperature reaction systems suitable for supercritical water oxidation.

BRIEF DESCRIPTION OF THE DRAWINGS

The present invention will become more fully understood from the detailed description of embodiments of the present invention given hereinbelow and the accompanying FIGS. 1–3 which are given by way of illustration only, and thus are not limitative of the invention.

DETAILED DESCRIPTION OF EMBODIMENTS

In the following description, for purposes of explanation and not limitation, specific details are set fourth, such as particular hardware, applications, techniques, etc. in order to provide a thorough understanding of the present invention. However, it will be apparent to one skilled in the art that the present invention may be practiced in other embodiments that depart from these specific details. In other instances, detailed descriptions of well-known methods, protocols, apparatus, and circuits are omitted so as not to obscure the description of the present invention with unnecessary details.

Figure 1:
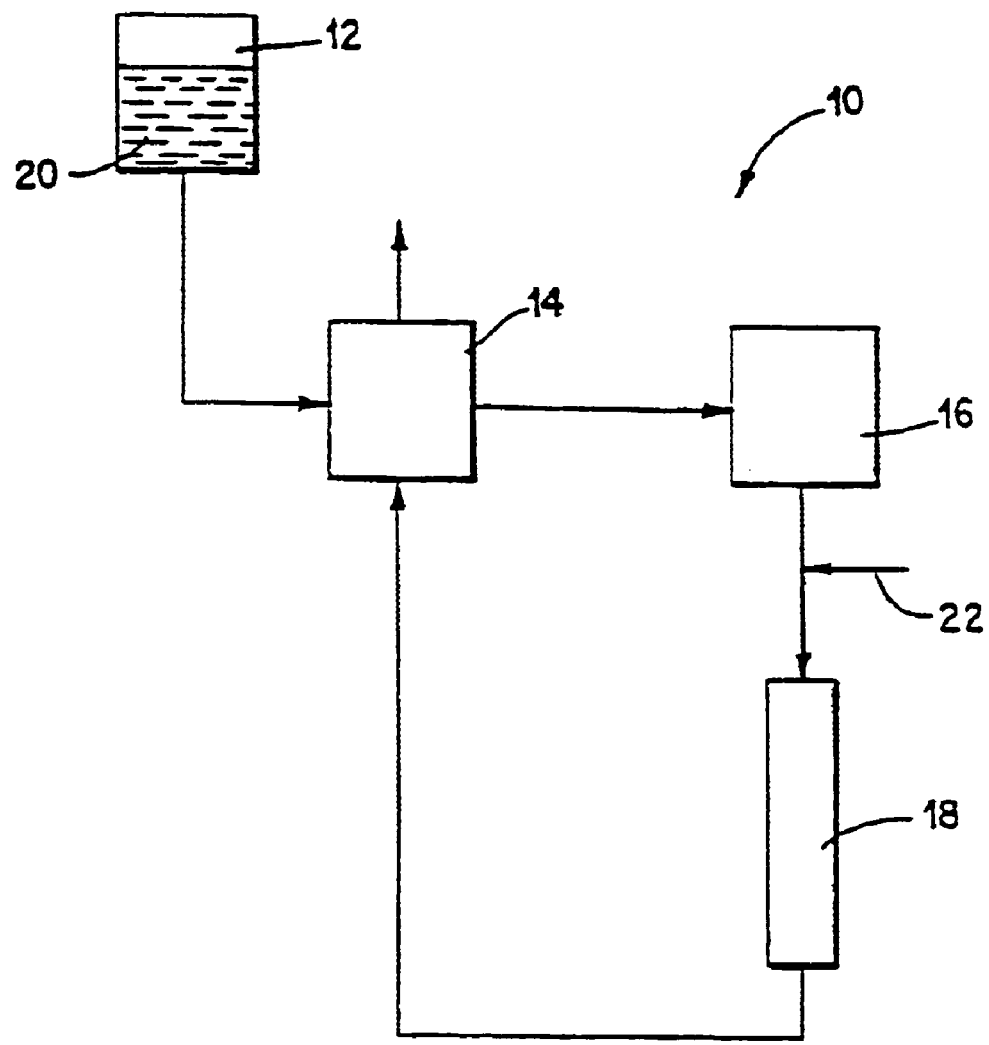
FIG. 1 shows a simplified block diagram of a reaction system suitable for oxidative waste treatment under supercritical water conditions wherein the present invention may be employed.

Considering FIG. 1, the operation of a high pressure and high temperature reaction system 10 such as a system suitable for oxidative waste treatment under supercritical water conditions, will briefly be overviewed so that in the subsequent detailed description of the present invention, the operation of the inventive apparatus may be better understood.

A conventional reaction system 10 comprises a primary tank 12, a heat exchanger 14, a heater 16 and a reaction chamber 18. A primary wastewater stream 20 passes initially through the first compartment (not shown) of the heat exchanger 14, then through the heater 16, and enters the reaction chamber 18 under pressure, after it has been mixed with oxidant coming through feed line 22. The organic matter contained in the primary waste stream 20 is oxidized, and in sequence, the hot effluence passes through the second compartment (not shown) of the heat exchanger 14. As well known, heat exchangers usually have two compartments, physically isolated from each other, which, however, are heat-communicating. The second compartment transfers heat to the first compartment.

Constructing materials for the reactor and the tubing may comprise steel, nickel-based alloys, platinum, gold, titanium, zirconium, ceramics, ceramic composites and other corrosion resistant materials as the environment inside the reaction chamber and tubing may be hostile and corrosive. However, as many of the latter materials are highly expensive, an optimal compromise between cost, on one hand, and corrosion resistance, on the other hand, is to use nickel based alloys such as Hastelloy or Inconel, for the manufacturing of such equipment.

As already discussed in the prior art, there is a number of species that are very aggressive relative to these nickel based alloys within a finite temperature range, among them nitric acid, sulfuric acid and hydrochloric acid. All these three acids are strongly corrosive between about 270 and 380° C., but the corrosion rates for the latter two acids are lower by a factor of ten than the one found for nitric acid, see said Kritzer article.

It is clear from the description above of the operation of the system that the wastewater flow, as well as any additives, will be heated from initial low temperatures, which probably are close to ambient temperatures, up to supercritical temperatures (above 374° C.) for the oxidative treatment of the waste, whereafter the effluent is cooled either in a heat exchanger or by mixing it with quench water or a combination of both.

The present inventors have realized that if the initial temperatures and the temperature of the cooled effluent are kept preferably well below 270° C. and the temperature in the reaction chamber is kept preferably above 380° C., there is generally only two sections of a reaction system made of nickel-based alloy that may be attacked by corrosive agents such as those mentioned above contained in, or supplied to, the wastewater flow, namely a "heating" section and a "cooling" section, where the temperatures are within the temperature interval of said corrosion.

The present invention is thus concerned with such sections of the reaction system and how to design them in order to provide a reaction system of low cost and good corrosion resistance. The idea is to provide appropriate tubing (made of nickel based alloy or other, preferably relatively inexpensive, material that is not corrosive resistant) of the system with a corrosive resistant tube or liner. The number of tubes or liners, their positions and their lengths are chosen in order to protect the system from corroding.

Hereinbelow will follow a few implementation examples of the present invention. Note that the terms "corrosive" and "corrosive-resistant material" as used in the description below and in the appended claims should be understood as "corrosive" relative conventional construction material for high pressure and high temperature reaction systems suitable for supercritical water oxidation such as steel, nickel based alloys, nickel-chromium alloys and the like, at least within a given temperature interval, and "corrosive-resistant material" refers to unconventional expensive material which is corrosion-resistant relative a wide variety of harsh media such as acids, particularly the acids discussed above, halogens and the like, respectively. Examples of corrosion-resistant materials will be given below.

Figure 2:
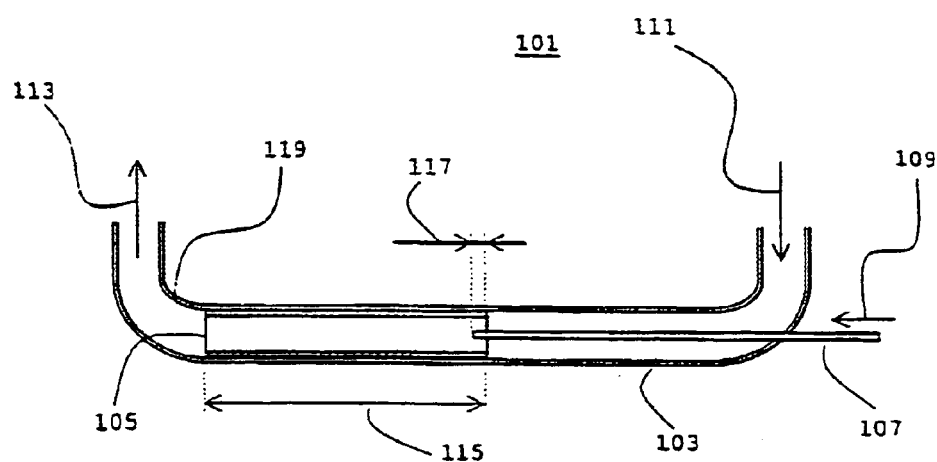
FIG. 2 shows, in cross-section, a first embodiment of an apparatus according to the present invention.

A first embodiment of the present invention, shown in FIG. 2, depicts an apparatus 101 for introducing nitric acid in a supercritical water flow containing ammonia or ammonium with the purpose of converting this to molecular nitrogen.

In a section of a reaction system tube 103, which preferably is the conduit between the heater 16 and the reaction chamber 18, or part of the reaction chamber itself, of FIG. 1, a separate tube or liner 105 of a corrosion resistant material is mounted, the outer surface of which is in fit with the inner surface of reaction system tube 103. Alternatively, tube 105 constitutes part of the reaction system tube 103 itself (not shown).

A feeding pipe 107 of relatively small diameter, is mounted through an opening of tube 103 and extends substantially axially with tube 103 and liner 105, and which ends in the interior of tube 103. Preferably, feeding pipe 107 and tube 103 are concentrically arranged for transportation of fluids, the former nitric acid and the latter preheated wastewater feed, in the same directions, as indicated by arrows 109–113. The temperature of the wastewater should preferably be above 380° C., and the temperature of the nitric acid should be low, preferably considerably lower than 270° C. Note that if the concentration of the corrosive agent is low, these temperature limits are not very crucial, i.e., the corrosion would be low at temperatures slightly lower than 380° C. and, particularly, at temperatures slightly higher than 270° C., e.g., 300° C.

By pumping nitric acid through the feeding pipe it will be preheated by the hot water flow and then get mixed with the supercritical water. The flow rates are such that the total flow (wastewater and nitric acid) becomes supercritical with a temperature of above 380° C. after having reached a steady temperature state a certain distance 115 from the end of the feeding pipe, said distance being referred to as the heat transfer or mixing length. Accordingly, to avoid any risk of corrosion of the inner walls of tube 103, the length of the liner 105 should be of at least this length, and it should be localized to protect the inner walls of tube 103 within this length. For practical reasons, the liner 105 may have an offset 117 in the end facing the end of the feeding pipe, i.e. extend beyond (upstream of) said feeding pipe end to avoid any risk of corrosion in that region.

The material of the liner and preferably of the feeding pipe is chosen according to its corrosion resistance relative nitric acid at the occurring temperatures. Literature data shows that titanium, generally, is a suitable material, but also materials such as zirconium, platinum, tantalum, niobium and ceramics may be chosen. The entire liner, or an inner coating thereof, may be constructed of such material.

Even if a limited degree of corrosion may exist using these materials, the components are relatively cheap and easy to replace when so needed.

Preferably, there are means for positioning and/or holding the liner in place. In the embodiment showed, tube 103 is provided with an elbow at the downstream end of the mixing length to prevent liner 105 from moving further downstream. However, any suitable means for positioning and/or holding the liner, e.g. flanges at the inner walls of tube 103, may be used.

In experimental work, an injection apparatus as the one shown in FIG. 2, was used, the liner and the feeding pipe being made of titanium. The ammonia destruction was performed by pumping 65% nitric acid into the reaction system during several hours without any detected corrosion. When the liner and the feeding pipe were demounted and inspected no corrosion of these components was discovered. In contrast thereto, in an experiment in which nitric acid was pumped into a supercritical water flow containing ammonia through a T-pipe of Inconel 625, the pipe was destroyed through corrosion in just a few hours.

Consequently, by using an injection apparatus according to FIG. 2, nitric acid may safely be introduced without severe corrosion of the reaction system.

Furthermore, a substantial portion of the reaction between nitric acid and ammonia and/or ammonium will take part as early as in the section of the reaction system where the liner is localized, which further reduces the risk for severe corrosion.

Alternatively, feeding pipe 107 and tube 103 of FIG. 2 may be arranged for transportation of a wastewater feed containing a corrosive agent such as a halogen, and water or a wastewater feed in lack of such a corrosive agent, respectively. The water or wastewater in tube 103 is preferably at a supercritical temperature, whereas the corrosive wastewater may be cooler.

Figure 3:
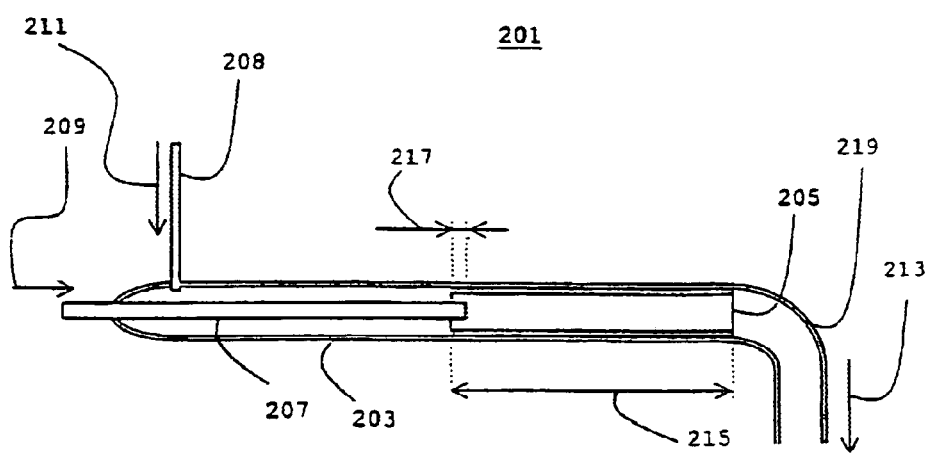
FIG. 3 shows, in cross-section, a second embodiment of an apparatus according to the present invention.

Referring next to FIG. 3, which illustrates an apparatus 201 according to a second embodiment of the present invention, a separate tube or liner 205 of a corrosion resistant material is mounted in a section of a reaction system tube 203, which is preferably at the effluent output or elsewhere in the exit path tubing. The outer surface of liner 205 is arranged to be in fit with the inner surface of the reaction system tube 203.

A first input tube 207, is mounted through an opening of tube 203 and extends substantially axially, preferably concentrically, with tube 203 and liner 205, and which ends in the interior of tube 203. A second input tube 208 is connected to tube 203 upstream from said end of input tube 207.

Input tube 207 and input tube 208 are arranged for transporting effluent from reactor 18 containing corrosive compounds such as nitric acid, sulfur acid, or the like, and quench water, respectively, in the directions as indicated by arrows 209–213. The effluent stream is supercritical or close to supercritical, and the temperature of the quench water is low, preferably at ambient temperature.

By pumping appropriate amounts of quench water through input tube 208, the effluent input through tube 207 will be cooled effectively by the quench water and get mixed with it. The flow rates are such that the total flow (effluent and quench water) will have a temperature of below a certain temperature, e.g. 270° C., depending on concentration of corrosive compounds, after having reached a steady temperature state a certain distance 215 from the end of the input tube 207, said distance being referred to as the mixing length. Accordingly, to avoid any risk of corrosion of the inner walls of tube 203, the length of the liner 205 should be at least of this mixing length, and it should be localized to protect the inner walls of tube 203 within this length. For practical reasons, the liner 205 may have an offset 217 in the end facing the end of tube 207, i.e. extend beyond (upstream of) said tube end, to avoid any risk of corrosion in that region.

The material of the liner and preferably of tube 207, as well as suitable means for positioning and/or holding the liner in place may be chosen as in the first embodiment.

The first and the second embodiments of the present invention may be modified to include a heat exchange for assisting in increasing or decreasing the temperature in tubes 103 and 203, respectively. Hereby, the lengths of liners 105 and 205, respectively, may be shortened.

As a further example of an implementation of the present invention (not illustrated in the drawings), an effluent from the reactor containing chlorine ions is pre-cooled in a heat exchanger by part of the incoming waste stream, to a temperature well above 380° C., e.g., 400° C. The effluent is then cooled by an apparatus according to the present invention to a sufficient low temperature, e.g., 260° C., to minimize corrosion. After leaving the apparatus, the effluent water mixture is further cooled by the remaining of the waste stream.

It will be obvious that the invention may be varied in a plurality of ways. For instance, the geometry and function of the reaction system and the appearance of the tubing may deviate substantially from the description above. Such and other variations are not to be regarded as a departure from the scope of the invention. All such modifications as would be obvious to one skilled in the art are intended to be included within the scope of the appended claims.

What is claimed is:

1. A method for injecting a first fluid of a first temperature at a first flow rate into a second fluid of a second temperature at a second flow rate in a high pressure and high temperature reaction system suitable for oxidative waste treatment, comprising:
    transporting the first fluid in a first conduit adapted to transport the first fluid;
    transporting the second fluid in a second conduit adapted to transport the second fluid, wherein the first conduit comprises an end within the interior of the second conduit, and wherein the first conduit is in fluid communication with the second conduit;
    mixing the first and the second fluids in the second conduit within a mixing length downstream of the end of the first conduit, wherein the second conduit comprises a tube or liner having at least an inner surface area made of a corrosion resistant material and extending along the mixing length to inhibit corrosion of the second conduit;
    wherein the first fluid is corrosive in a corrosive temperature range;
    wherein the corrosive temperature range excludes the second temperature and includes the first temperature;
    wherein the second temperature is selected to be lower than the corrosive temperature range;
    wherein the first and second temperatures and the first and second flow rates are selected such that the temperature of the mixed fluids downstream of the mixing length is lower than the corrosive temperature range; and
    wherein the first and second temperatures and the first and second flow rates are selected such that the mixed fluids downstream of the mixing length are at a temperature that is substantially non-corrosive for the first fluid.

2. The method of claim 1, wherein the first fluid is corrosive at the first temperature, and wherein at least an inner surface area of the first conduit is made of a corrosion resistant material to inhibit corrosion of the first conduit.

3. The method of claim 1, wherein the first fluid comprises nitric acid, and wherein the corrosive temperature range is between about 270° C. and about 380° C.

4. The method of claim 1, wherein the first fluid comprises sulfuric acid.

5. The method of claim 1, wherein the first fluid comprises hydrochloric acid.

6. The method of claim 1, wherein the first fluid comprises a halogen.

7. The method of claim 1, further comprising feeding the mixed fluids from the second conduit to a reactor of a high pressure and high temperature reaction system for oxidation of waste material.

8. The method of claim 1, wherein the second conduit comprises part of a reactor of a high pressure and high temperature reaction system for oxidation of waste material.

9. The method of claim 1, wherein the second fluid comprises cooling water.

10. The method of claim 9, wherein the first fluid comprises destructed supercritical wastewater output from a reactor of a high pressure and high temperature reaction system.

11. The method of claim 10, wherein the mixed fluids in the second conduit are output from the high pressure and high temperature reaction system.

12. The method of claim 1, wherein at least the inner surface area of the tube or liner is made of a material selected from the group consisting of titanium, zirconium, platinum, tantalum, niobium, or alloys thereof.

13. A method for injecting a first fluid of a first temperature at a first flow rate into a second fluid of a second temperature at a second flow rate in a high pressure and high temperature reaction system suitable for oxidative waste treatment, comprising:
    transporting the first fluid in a first conduit adapted to transport the first fluid;
    transporting the second fluid in a second conduit adapted to transport the second fluid, wherein the first conduit comprises an end within the interior of the second conduit, and wherein the first conduit is in fluid communication with the second conduit;
    mixing the first and the second fluids in the second conduit within a mixing length downstream of the end of the first conduit, wherein the second conduit comprises a tube or liner having at least an inner surface area made of a corrosion resistant material and extending along the mixing length to inhibit corrosion of the second conduit;
    wherein the first fluid is corrosive in a corrosive temperature range;
    wherein the corrosive temperature range lies between the first temperature and the second temperature;
    wherein the second temperature is selected to be lower than the corrosive temperature range;
    wherein the first and second temperatures and the first and second flow rates are selected such that the temperature of the mixed fluids downstream of the mixing length is lower than the corrosive temperature range; and
    wherein the first and second temperatures and the first and second flow rates are selected such that the mixed fluids downstream of the mixing length are at a temperature that is substantially non-corrosive for the first fluid.

14. The method of claim 13, wherein the first fluid comprises sulfuric acid.

15. The method of claim 13, wherein the first fluid comprises hydrochloric acid.

16. The method of claim 13, wherein the second fluid comprises cooling water.

17. The method of claim 16, wherein the first fluid comprises destructed supercritical wastewater output from a reactor of a high pressure and high temperature reaction system.

18. The method of claim 17, wherein the mixed fluids in the second conduit are output from the high pressure and high temperature reaction system.

19. The method of claim 13, wherein the first fluid comprises nitric acid, and wherein the corrosive temperature range is between about 270° C. and about 380° C.

20. A method for injecting a first fluid of a first temperature at a first flow rate into a second fluid of a second temperature at a second flow rate in a high pressure and high temperature reaction system suitable for oxidative waste treatment, comprising:
    transporting the first fluid in a first conduit adapted to transport the first fluid;
    transporting the second fluid in a second conduit adapted to transport the second fluid, wherein the first conduit comprises an end within the interior of the second conduit, and wherein the first conduit is in fluid communication with the second conduit;
    mixing the first and the second fluids in the second conduit within a mixing length downstream of the end of the first conduit, wherein the second conduit comprises a tube or liner having at least an inner surface area made of a corrosion resistant material and extending along the mixing length to inhibit corrosion of the second conduit, and upstream and downstream of the tube or liner, the second conduit comprises a construction material for high pressure and high temperature reaction systems suitable for supercritical water oxidation;
    wherein the first fluid is corrosive in a corrosive temperature range;
    wherein the corrosive temperature range excludes the second temperature and includes the first temperature;
    wherein the second temperature is selected to be higher than the corrosive temperature range;
    wherein the first and second temperatures and the first and second flow rates are selected such that the temperature of the mixed fluids downstream of the mixing length is higher than the corrosive temperature range; and
    wherein the first and second temperatures and the first and second flow rates are selected such that the mixed fluids downstream of the mixing length are at a temperature that is substantially non-corrosive for the first fluid.

21. The method of claim 20, wherein the first fluid comprises a halogen.

22. The method of claim 20, wherein the second fluid comprises supercritical water.

23. The method of claim 22, wherein the second fluid comprises nitrogenous compounds.

24. The method of claim 20, wherein at least the inner surface area of the tube or liner is made of a material selected from the group consisting of titanium, zirconium, platinum, tantalum, niobium, or alloys thereof.

25. The method of claim 20, wherein the first fluid comprises nitric acid, and wherein the corrosive temperature range is between about 270° C. and about 380° C.

26. The method of claim 20, wherein the first fluid comprises sulfuric acid.

27. The method of claim 20, wherein the first fluid comprises hydrochloric acid.

28. A method for injecting a first fluid of a first temperature at a first flow rate into a second fluid of a second temperature at a second flow rate in a high pressure and high temperature reaction system suitable for oxidative waste treatment, comprising:
    transporting the first fluid in a first conduit adapted to transport the first fluid;
    transporting the second fluid in a second conduit adapted to transport the second fluid, wherein the first conduit comprises an end within the interior of the second conduit, and wherein the first conduit is in fluid communication with the second conduit;
    mixing the first and the second fluids in the second conduit within a mixing length downstream of the end of the first conduit, wherein the second conduit comprises a tube or liner having at least an inner surface area made of a corrosion resistant material and extending along the mixing length to inhibit corrosion of the second conduit and upstream and downstream of the tube or liner, the second conduit comprises a construction material for high pressure and high temperature reaction systems suitable for supercritical water oxidation;
    wherein the first fluid is corrosive in a corrosive temperature range;
    wherein the corrosive temperature range lies between the first temperature and the second temperature;
    wherein the second temperature is selected to be higher than the corrosive temperature range;
    wherein the first and second temperatures and the first and second flow rates are selected such that the temperature of the mixed fluids downstream of the mixing length is higher than the corrosive temperature range; and
    wherein the first and second temperatures and the first and second flow rates are selected such that the mixed fluids downstream of the mixing length are at a temperature that is substantially non-corrosive for the first fluid.

29. The method of claim 28, wherein the first fluid comprises a halogen.

30. The method of claim 28, wherein the second fluid comprises supercritical water.

31. The method of claim 30, wherein the second fluid comprises nitrogenous compounds.

32. The method of claim 28, wherein at least the inner surface area of the tube or liner is made of a material selected from the group consisting of titanium, zirconium, platinum, tantalum, niobium, or alloys thereof.

33. The method of claim 28, wherein the first fluid comprises sulfuric acid.

34. The method of claim 28, wherein the first fluid comprises hydrochloric acid.

35. The method of claim 28, wherein the first fluid comprises nitric acid, and wherein the corrosive temperature range is between about 270° C. and about 380° C.

* * * * *